US008844551B2

(12) United States Patent
Doughty et al.

(10) Patent No.: US 8,844,551 B2
(45) Date of Patent: Sep. 30, 2014

(54) LEAK DETECTION LOGIC FOR CLOSED-VOLUME SYSTEM

(75) Inventors: Kurt J. Doughty, Berlin, CT (US); Terrance R. Snider, Belchertown, MA (US); Daniel Uttberg, Agawam, MA (US); Eric A. Rohrbach, Lebanon, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 660 days.

(21) Appl. No.: 13/161,930

(22) Filed: Jun. 16, 2011

(65) Prior Publication Data

US 2012/0318368 A1 Dec. 20, 2012

(51) Int. Cl.
*F17D 5/06* (2006.01)
*G01M 3/40* (2006.01)
*G01M 3/28* (2006.01)
*G01M 3/32* (2006.01)

(52) U.S. Cl.
CPC .............. *G01M 3/3227* (2013.01); *G01M 3/40* (2013.01); *G01M 3/2815* (2013.01)
USPC ........................... 137/12; 137/15.11; 137/563

(58) Field of Classification Search
USPC ......................................... 137/12, 15.11, 563
See application file for complete search history.

(56) References Cited

U.S. PATENT DOCUMENTS

| 4,133,373 | A | 1/1979 | Slagley et al. |
| 6,074,092 | A | 6/2000 | Andrews |
| 8,130,107 | B2 * | 3/2012 | Meyer ............................ 137/312 |
| 8,333,210 | B1 * | 12/2012 | Henkel et al. ............... 137/15.11 |
| 2003/0062149 | A1 | 4/2003 | Goodson et al. |

FOREIGN PATENT DOCUMENTS

| EP | 1 510 801 A1 | 3/2005 |
| EP | 1510804 | 3/2005 |

OTHER PUBLICATIONS

Extended European Search Report for EP Application Serial No. 12172316.7, dated Nov. 22, 2012, 7 pages.

* cited by examiner

*Primary Examiner* — Kevin Lee
(74) *Attorney, Agent, or Firm* — Kinney & Lange, P.A.

(57) ABSTRACT

A method for detecting a leak in a closed-volume liquid system comprises circulating a fluid through a closed-loop with a pump having a reservoir and that is driven by an electric motor. The method also comprises sensing a pressure in the closed-loop, sensing current draw by the motor and sensing fluid level in the reservoir. The method further comprises determining a presence of a leak of fluid from the closed-loop based upon two of the sensed signals using a first leak detection logic, and determining the presence of a leak of fluid from the closed-loop based upon at least one of the sensed signals using a second leak detection logic.

17 Claims, 2 Drawing Sheets

LEAK DETECTION LOGIC FOR CLOSED-VOLUME SYSTEM

CROSS-REFERENCE TO RELATED APPLICATION(S)

Reference is made to a patent application entitled "LEAK ISOLATION LOGIC FOR CLOSED-VOLUME SYSTEM" by K. Henkel, K. Doughty, T. Snider, D. Uttberg and E. Rohrbach, Ser. No. 13/161,911, now U.S. Pat. No. 8,333,210, filed on the same day herewith and assigned to the same assignee as the present application, which is incorporated by reference.

BACKGROUND

The present invention relates generally to closed-volume systems such as those used in liquid cooling systems. More particularly, the present invention is directed to methods for detecting a leak in a closed-volume system.

Closed-volume liquid systems include a pump that operates to circulate a fluid through a loop having a fixed volume at constant temperature. The volume varies only with thermal contractions and expansions due to temperature fluctuations. The pump includes a pumping mechanism, such as an impeller, that receives low pressure fluid at an inlet and produces high pressure fluid at an outlet. Closed-volume liquid systems are often configured to circulate fluid through various components in aircraft systems. Sometimes the components are critical to controlling and maintaining flight of the aircraft and require prolonged cooling to function. It is imperative to maintain functionality of the components even after a leak in the system occurs. It is therefore desirable to detect and isolate leaks in closed-volume systems as quickly as possible before a significant volume of the fluid is lost and operation of the system can no longer be maintained. Furthermore, leaked fluids from the closed-volume systems can become a fire hazard or can cause interference with operation of electrical equipment. It is therefore desirable to quickly detect and isolate a leak in a closed-volume system.

Many closed-volume liquid systems include control systems that execute leak detection logic. The control system monitors conditions of the closed-volume system that are indicative of the liquid in the system. Level sensors can be provided in the liquid system to directly provide an indication that fluid from the system has been lost. Also, pressure sensors are positioned at various places in the loop that provide an indication of the performance of the pump. If pressures in the loop fall below prescribed levels, it is an indication that a leak exists in the system. Typical leak indicators such as level and pressure are not always reliable for every pump condition and may sometimes provide inaccurate readings. There is, therefore, a need for improved leak detection logic in closed-volume systems.

SUMMARY

The present invention is directed to a method for detecting a leak in a closed-volume liquid system. The method comprises circulating a fluid through a closed-loop with a reservoir and pump that is driven by an electric motor. The method also comprises sensing a pressure in the closed-loop, sensing current draw of the motor and sensing fluid level in the reservoir. The method further comprises determining a presence of a leak of fluid from the closed-loop based upon two of the sensed signals using a first (primary) leak detection logic which monitors fluid levels in the reservoir and pressure in the closed-loop, and determining the presence of a leak of fluid from the closed-loop based upon at least one of the sensed signals using a second (secondary) leak detection logic which monitors current draw of the motor and pressure in the closed-loop.

DETAILED DESCRIPTION

Figure 1:
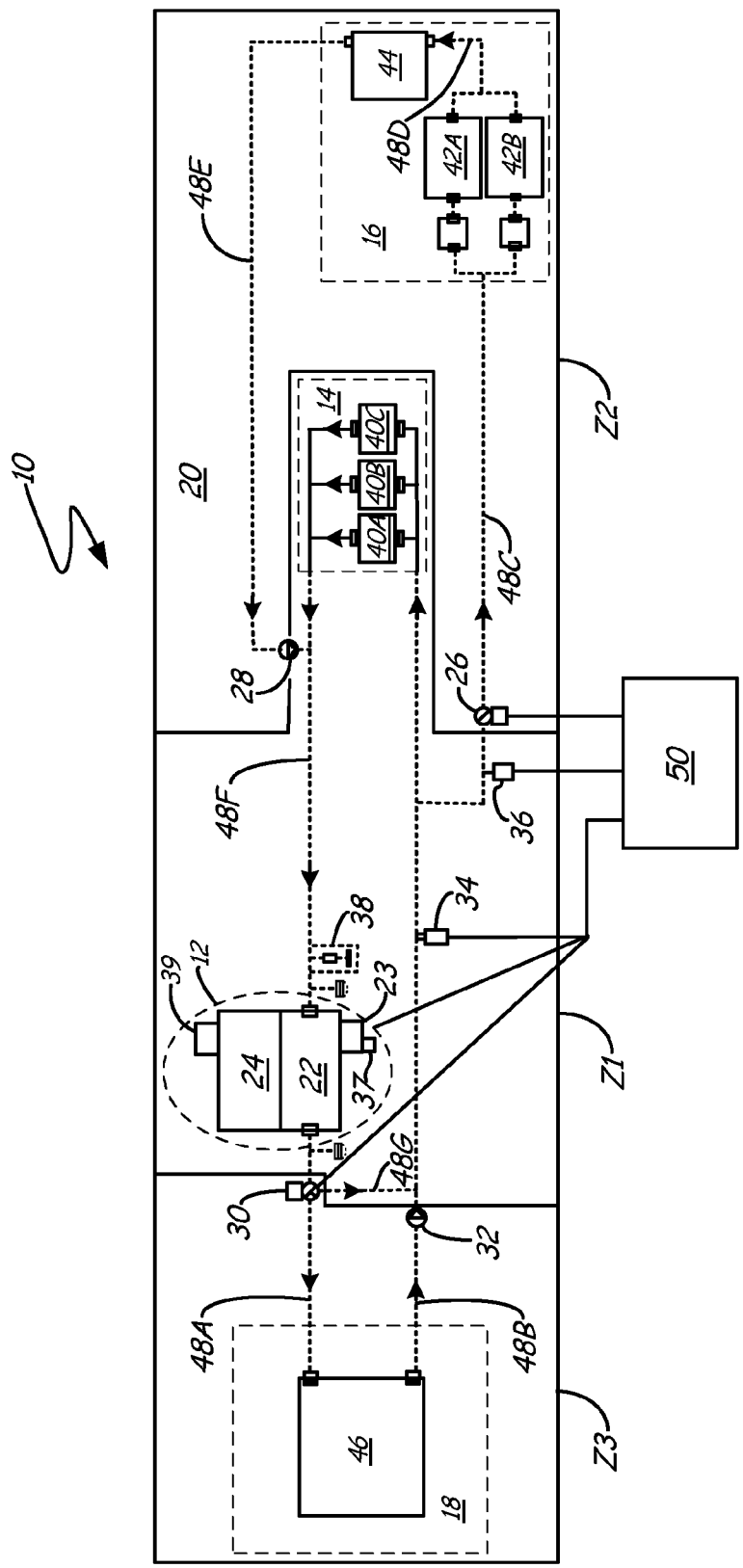
FIG. 1 is a schematic of a closed-volume liquid system used to cool power electronics in an aircraft.

FIG. 1 is a schematic of liquid system 10 having non-isolatable zone Z1 and isolatable zones Z2 and Z3. Pump zone 12 and load zone 14 comprise non-isolatable zone Z1 of system 10, and load zones 16 and 18 comprise isolatable zones Z2 and Z3, respectively, of system 10. Pump zone 12 includes pump 22, motor 23 and reservoir 24. Liquid system 10 includes first control valve 26 and first check valve 28, which are associated with isolatable zone Z2, and second control valve 30 and second check valve 32, which are associated with isolatable zone Z3. Liquid system 10 also includes temperature sensor 34, pressure sensor 36, ammeter 37, port 38 and first level sensor 39. Load zone 14 includes electronics 40A, 40B and 40C; load zone 16 includes supplemental cooling units (SCUs); and load zone 18 includes heat exchanger 46. Reservoir 24 primes pump 22, and motor 23 drives pump 22, such that fluid is circulated through liquid circulation lines 48A-48G. Control system 50 is electrically coupled to control valves 26 and 30, sensors 34, 36, 37 and 39 and motor 23 through appropriate wiring (not all of which is shown in FIG. 1) to operate system 10.

Liquid system 10 comprises a system for circulating fluid through a closed-volume loop. In the described embodiment, system 10 comprises a cooling system integrated into an aircraft power electronics cooling system (PECS) that circulates a cooling fluid. As such, system 10 is typically incorporated into an aircraft airframe including various bays. For example, load zone 14 comprises a pressurized electronics bay within the aircraft including power electronics 40A-40C. Pump zone 12 can be located in an un-pressurized area of the aircraft, such as a wheel well compartment. Load zone 16 comprises a pressurized bulk cargo bay within the aircraft that includes environmental control systems. SCUs 42A and 42B comprise condensers of a vapor-cycle cooling system, which is coupled to another liquid control system (LCS). Heat exchanger 44 is coupled with a low pressure air cooling system. Load zone 18 comprises a ram air duct exposed to ambient airstreams and includes heat exchanger 46.

Pump 22 pressurizes a cooling fluid within loop lines 48A-48G. The fluid flows from pump 22, through control valve 30 to heat exchanger 46 through liquid line 48A. Cooling air passing through the ram air duct of zone 18 cools the cooling fluid within heat exchanger 46. The cooled fluid travels through liquid line 48B to zone 14. Within zone 14, power electronics 40A-40C input heat to the cooling fluid before the fluid is passed to liquid line 48F and back to reservoir 24. Likewise, the cooled fluid travels in parallel to zone 16 through liquid line 48C. Within zone 16, SCUs 42A and 42B add heat to the cooling fluid, some of which is removed via heat exchanger 44 with air flow as the cooling media. The liquid cooling fluid flows through lines 48D and 48E, before the fluid travels back out to liquid line 48F and into pump 22.

Pump 22 comprises any known pump that produces a pressure-rise or a flow of fluid. Although described with respect to centrifugal pumps, such as centrifugal impeller pumps, that generate pressure-rise, the invention also achieves benefits with respect to other types of pumps, such as positive displacement pumps, that generate flow. In another embodiment, pump 22 comprises a reciprocating piston pump. Motor 23 comprises an electric motor that drives the pumping mechanism of pump 22. For example, motor 23 may comprise a direct current (DC) or alternating current (AC) motor that operates at speeds directly proportional to the amount of electric current drawn by motor 23 from, for example, control system 50. Ammeter 37 provides control system 50 a current signal indicating the magnitude of the electric current provided to motor 23.

Reservoir 24 comprises an expandable-volume enclosure that holds liquid for system 10. Reservoir 24 expands to accommodate volumetric thermal expansion of the liquid cooling fluid. As such, the maximum volume of system 10 is fixed at the upper capacity of reservoir 24. In one embodiment, reservoir 24 includes a spring-loaded piston to maintain liquid engaged with the inlet of pump 22, and in another embodiment, a bootstrap reservoir as is known in the art provides for the liquid engagement. As such, pump 22 is properly primed at the inlet to prevent cavitation across varying thermal conditions, and the outlet produces the proper pressure increase to service system 10 in the case of centrifugal pumps. As mentioned, the invention is also applicable to positive displacement pumps that produce flow resulting in a pressure rise. Reservoir 24 includes first level sensor 39, which provides control system 50 a level signal indicating the magnitude of the level of fluid in reservoir 24.

Flow control valves 26 and 30 remain open during normal operation of system 10 such that fluid flows to zones 16 and 18. Control system 50 maintains circulation of the liquid cooling fluid through lines 48A-48F at rates adequate to maintain cooling. Control system 50 operates valves 26 and 30 based on input from temperature sensor 34 and pressure 36 to control the amount of cooling provided to power electronics 40A-40C and SCUs 42A and 42B. Control system 50 comprises any conventional computer controller system capable of performing computations on sensor input and executing control logic, as are known in the art. Liquid system 10 circulates fluid to keep electronics 40A-40C and SCUs 42A and 42B operating under normal conditions.

Under certain conditions or circumstances, flow of liquid through lines 48A-48G may become compromised. For example, a leak may form due to a liquid system failure, an aircraft system failure, or a cargo event. As such, cooling fluid may leak from system 10, diminishing the performance of SCUs 42A and 42B and reducing the cooling to electronics 40A-40C. If the volume of cooling fluid drops within system 10 such that reservoir 24 cannot maintain the inlet to pump 22 properly primed, the pressure in system 10 will drop and flow will be reduced. If enough fluid leaks out, performance of system 10 will be rendered completely ineffective. It is desirable to quickly ascertain when a leak occurs in liquid system 10. Control system 50 includes leak detection logic and leak isolation logic to determine the presence of a leak and subsequently isolate the leak such that system 10 can continue to operate under conditions other than normal. Specifically, control system 50 includes primary and secondary leak detection logic algorithms to provide redundant leak detection quickly and accurately. In particular, secondary leak detection logic is advantageous in systems using bootstrap reservoirs where forces acting on the reservoir piston may be insufficient to cause movement that effectively enables the primary leak detection logic. After a leak is detected, control system 50 actuates control valves 26 and 30 to simultaneously isolate zones 16 and 18. The logic further evaluates the system 10 until the leak is located and remains isolated, and the unaffected zones return to normal operation.

Leak detection comprises watching for abnormal conditions in the operation of system 10 that would not occur under normal conditions, but that do occur when fluid levels are abnormally low. For example, when a leak occurs, fluid pressures and levels in system 10 are directly affected. However, abnormal conditions may affect the operation of level indicators tied to the function of the reservoir piston. For example, at high altitudes when the ambient pressure may not contribute enough "downward" force on the reservoir piston, the piston may not accurately reflect the level. Furthermore, when fluid levels in system 10 drop significantly, reservoir 24 may be unable to properly prime pump 22 such that outlet pressures fall below what is otherwise expected and the pump cavitates, resulting in the pump motor drawing less current due to reduced resistance.

Thus, three variables are affected when fluid levels in system 10 drop below normal level: fluid pressure, fluid level and motor current. Levels for all three of these variables, and how the variables change over time as conditions of system 10 change, are stored within control system 50 for normal operating conditions of system 10. Thus, control system 50 can compare real-time data for these levels to stored normal operating conditions to look for leak conditions.

Figure 2:
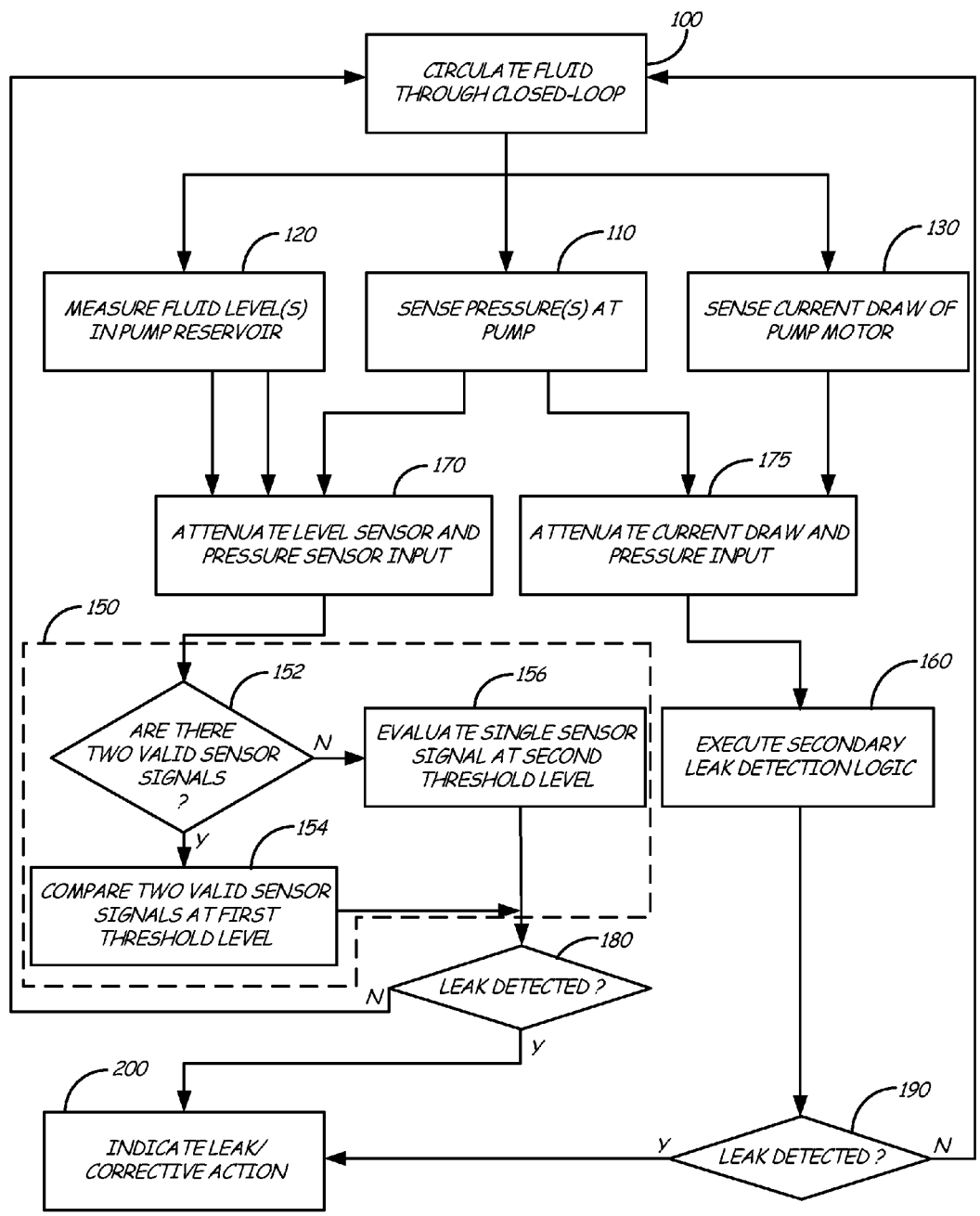
FIG. 2 is a flow chart diagramming a method for detecting a leak in the closed-volume liquid system of FIG. 1.

FIG. 2 is a flow chart diagramming a method for detecting a leak in a closed-volume liquid system. In the described embodiment, the method operates a closed-volume liquid system such as system 10 described with reference to FIG. 1. However, the method may be applied to any closed-loop or closed-volume liquid system having fluid circulated by a pump driven by an electric motor.

System 10 is controlled by system 50 to operate under normal conditions at step 100 such that the liquid cooling fluid circulates through all of zones Z1-Z3. For example, the amount of fluid flow to zone Z3 and zone Z2 is changed by adjusting flow control valves 26 and 30, respectively, based on temperature and pressure inputs. Control system 50 gathers various sensor inputs at steps 110, 120 and 130 such that primary leak detection logic can be executed at step 150 and secondary leak detection logic can be executed at step 160. The primary and secondary leak detection logics operate in the background to detect if a leak is present while system 10 operates under normal conditions.

Pressure sensor 36 provides a pressure signal to control system 50 at step 110. In the embodiment of FIG. 1, pressure sensor 36 is coupled to fluid line 48C. However, in other embodiments, a pressure sensor can be positioned in line 48A to provide pump outlet pressure and a pressure sensor can be positioned in line 48F to provide pump inlet pressure. Any conventional pressure sensor may be used as pressure sensor 36.

First level sensor 39 provides a level signal to control system 50 at step 120. First level sensor 39 is coupled to reservoir 24 to determine a position of the piston within the reservoir housing. During normal operation of system 10, thermal expansion of the cooling fluid causes slow movements of the piston of reservoir 24. When a leak occurs, movement of the piston is more rapid. Liquid system 10 may also include other level sensors, such as a second redundant level sensor (not shown) identical to first level sensor 39. First level sensor 39 comprises any known sensor in the art, such as a linear variable displacement transformer.

At step 130, ammeter 37 senses the current drawn by motor 23. The current drawn by motor 23 fluctuates depending on the voltage applied to motor 23 by control system 50 and based on the resistance of the fluid applied to the pumping mechanism. For example, current usage increases at constant voltage when electrical load on the motor increases, such as due to increased mechanical load from higher fluid pressures in the pump. Ammeter 37 provides a current signal to control system 50. Any conventional current sensor may be used.

At step 150, control system 50 executes primary leak detection logic. Primary leak detection is executed using pressure signals and level signals. At step 160, control system executes secondary leak detection logic. Secondary leak detection is executed using pressure signals and the current signal. Control system 50 attenuates the pressure signals and level signals at step 170 such that the primary leak detection logic at step 150 is filtered for noise. Control system 50 attenuates the pressure signals and current signal at step 175 such that the secondary leak detection logic at step 160 is filtered and attenuated (lag filter) such that, the primary leak detection logic at step 150 has had an opportunity to function prior to the secondary leak detection logic at step 160.

In step 150, control system 50 monitors output of pressure sensor 36 and first level sensor 39 at steps 120 and 110, respectively. A third signal is monitored from another sensor as well, such as a second level sensor at step 120, so that three leak indicators are provided. At step 170, control system 50 attenuates each sensor signal. For example, the signals are filtered using a time constant to reduce noise. At step 152, control system 50 determines if there are two valid sensor signals. For example, if a sensor is not properly functioning, control system 50 may not receive a sensor signal input or one that contains useable information. If two valid sensor signals are detected, control system 50 compares the rate of change of the output of these sensors to stored values for operation of system 10 to look for output levels below normal at step 154.

At step 154, control system 50 evaluates the sensor signals at a first threshold level. For example, the pressure signal may be evaluated based on the rate at which the pressure signal changes to determine a pressure drop from a leak. Because two independent signals are being evaluated, control system 50 can afford to use lower thresholds (more sensitivity) for the change in pressure to be sure that the pressure drop is from a leak rather than normal operation. When control system 50 detects that output from two of the three sensors is indicating a leak condition at step 180, a leak is determined at step 180. At step 200, control system 50 indicates the leak and takes corrective action, as discussed below.

If, however, control system 50 cannot confirm that two sensor signals are valid or properly functioning, leak detection can be carried out using only a single sensor signal at step 156. At step 156, control system 50 simply compares a single rate of change of the signal to stored values of a second threshold level. The threshold magnitude for the rate of change of the single signal is increased (less sensitivity) because control system 50 has no other independent confirmation that a leak is occurring. For example, control system 50 looks for a more rapid drop in pressure that is more assuredly indicative of a leak rather than normal operation. If a single sensor signal indicates a rapid pressure or level drop, a leak condition is determined at step 180 and corrective action can be taken at step 200.

If, however, two leak indicators can be sensed at step 152 and a change in two sensor signals does not rise to the first threshold level, or two leak indicators cannot be sensed at step 152 and a change in a sensor signal does not rise to the second threshold level, then the primary leak detection logic will not indicate a leak condition at step 180. For example, under certain operating conditions of system 10 it is possible for the piston of reservoir 24 to become temporarily immobilized. When an extensive leak occurs, the pressure at the outlet of pump 22 is significantly below normal, which can sometimes approach the pressure at the pump inlet which is low when the aircraft is at altitude. This causes a force balance on the piston of reservoir 24, which temporarily immobilizes the piston. Thus, first level sensor 39 does not detect a change in the position of the piston and control system 50 does not receive a leak indicator. Without the ability to receive two leak indicators, control system 50 will be unable to determine a leak condition. However, control system 50 will continue to operate primary leak detection logic at step 150 without achieving success at step 180.

In addition to primary leak detection logic, control system 50 runs secondary leak detection logic in parallel. Secondary leak detection logic is operated using the pressure signals from pressure sensor 36 and the current signal from ammeter 37. Control system 50 uses the rate of change of the pressure and current signals to detect a leak. Control system 50 may also use the absolute value of the sensor signals to perform secondary leak detection logic. Rate of change of sensor signals is a leading indicator of the data collected. Absolute value of sensor signals is a lagging indicator of the data collected. As such, control system 50 can use absolute values for the pressure and current signals as a means for attenuating the secondary leak detection logic to ensure the secondary leak detection logic is indicates a leak after the primary leak detection logic has an opportunity to identify a leak. Other means of attenuation may also be used.

Control system 50 filters noise out of the pressure signal, the level signal and the current signal by looking at the rate of change of each signal over a specified time period. The pressure signal and current signal are attenuated at step 175 such that the secondary leak detection logic is triggered after the primary leak detection logic. It is possible for the secondary leak detection logic to be executed in parallel with the primary leak detection logic so long as the attenuation delays when the secondary leak detection logic identifies a leak until after the first leak detection logic has an opportunity to identify the leak. Attenuation of the signals at step 175 comprises, in one embodiment, filtering of the signals using a large time constant to reduce noise and effectively delay the secondary leak detection. Specifically, when analyzing the current signal, control system 50 compares the rate of change of the current signal over a longer period of time as compared to the level signal. Attenuated as such, control system 50 is configured such that the secondary leak detection logic will not be triggered at step 160 before the primary leak detection logic has an opportunity to determine the presence of a leak at step 150.

Control system 50 compares the rate of change of the output of these sensors to stored values for operation of system 10 to look for output levels below normal. When control system 50 detects that output from these two sensors is below normal at step 160, a leak condition is determined at step 190. If a positive leak condition is determined at step 180 and at step 190, control system 50 will move to step 200 based on step 180, before receiving input from step 190, rendering step 190 redundant. At step 200 control system 50 provides an audible or visual indication of a leak in system 10 to a desirable location, such as the aircraft flight deck. Additionally, control system 50 initiates corrective action, such as operating leak isolation logic to determine the location of the leak and to segregate zone Z2 or Z3 from zone Z1. Depending on the extent and location of the leak, the aircraft will also perform a landing maneuver such that maintenance can be performed to fix the leak. In any event, the leak is subsequently repaired and additional fluid can be added to system 10 at port 38. Leak detection logic can continue to run in the background at any time system 10 is operating.

The present invention provide methods for detecting a leak in a closed-volume system. Specifically, the invention allows for primary and secondary leak detection logic to be executed in parallel to primary leak detection logic. The primary leak detection logic operates using one or two of three separate sensor inputs to determine a leak. For example, a single sensor input can be used at higher threshold levels as compared to when two sensor inputs are available. The secondary leak detection logic operates using system variables at least partially different from those used in the primary leak detection logic. As such, in the event one of the variables of the primary leak detection logic becomes compromised, another method of detecting a leak is still operative. Leaks in the closed-volume system can, therefore, be quickly and accurately detected and isolated.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for detecting a leak in a closed-volume liquid system, the method comprising:
   circulating a fluid through a closed-loop with a pump driven by an electric motor;
   sensing a pressure in the closed-loop;
   sensing current draw by the electric motor; and
   determining a presence of a leak of fluid from the closed-loop based upon the sensed pressure and the sensed current draw.

2. The method of claim 1 wherein the closed-volume liquid system includes a reservoir having a piston that expands a reservoir volume between a maximum and a minimum.

3. The method of claim 2 wherein the closed-volume liquid system comprises a cooling system for an aircraft including a heat exchanger that acts as a heat sink and electronics that act as a heat source.

4. The method of claim 2 and further comprising the step of sensing level of the fluid in the closed-loop.

5. The method of claim 4 wherein the level is determined by a position of the piston in the reservoir.

6. The method of claim 5 and further comprising:
   sensing level of the fluid using a first level sensor that generates a first level signal;
   sensing pressure in the closed-loop using a first pressure sensor that generates a first pressure signal; and
   sensing current draw by the electric motor using an ammeter that generates a current signal.

7. The method of claim 6 wherein the step of determining a presence of a leak comprises:
   observing the occurrence of both a decrease in sensed level and a decrease in sensed pressure, or a decrease in sensed pressure and a decrease in sensed current draw; and
   comparing the sensed level, pressure and current draw to values of level, pressure and current draw for operating conditions of the system under non-leak conditions.

8. The method of claim 7 and further comprising attenuating the pressure signal and the current signal before determining the presence of the leak using the sensed pressure and sensed current draw such that the presence of the leak can be first determined using the sensed level and sensed pressure.

9. The method of claim 7 and further comprising:
   sensing level of the fluid using a second level sensor that generates a second level signal; and
   determining the presence of the leak using two signals from the group consisting of: the first level signal, the second level signal and the first pressure signal.

10. The method of claim 1 and further comprising the step of taking corrective action when a leak is determined, the corrective action comprising at least one of: isolating the leak, indicating the leak, continued operation of the system until repairing the leak, replenishing the leak and stopping operation of the system.

11. A method for detecting a leak in a closed-volume liquid system, the method comprising:
   circulating a fluid through a closed-loop with a pump;
   adjusting volume of the closed-loop with a fluid reservoir;
   sensing a pressure in the closed-loop;
   sensing level in the closed-loop by determining a position of a piston in the reservoir; and
   determining a presence of a leak of fluid from the closed-loop based upon the sensed pressure and the sensed level.

12. The method of claim 11 wherein the closed-volume liquid system comprises a cooling system for an aircraft including a heat exchanger that acts as a heat sink and electronics that act as a heat source.

13. The method of claim 11 and further comprising:
   sensing level of the fluid using a second level sensor that generates a second level signal; and
   determining the presence of the leak using two signals from the group consisting of: the first level signal, the second level signal and the first pressure signal.

14. The method of claim 11 and further comprising:
   driving the pump with an electric motor;
   sensing current draw by the electric motor;
   sensing level of the fluid using a first level sensor that generates a first level signal;
   sensing pressure in the closed-loop using a first pressure sensor that generates a first pressure signal; and
   sensing current draw by the electric motor using an ammeter that generates a current signal.

15. The method of claim 14 wherein the step of determining a presence of a leak comprises:
   observing the occurrence of both a decrease in sensed level and a decrease in sensed pressure, or a decrease in sensed pressure and a decrease in sensed current draw; and
   comparing the sensed level, pressure and current draw to values of level, pressure and current draw for operating conditions of the system under non-leak conditions.

16. The method of claim 15 and further comprising attenuating the pressure signal and the current signal before determining the presence of the leak using the sensed pressure and sensed current draw such that the presence of the leak can be first determined using the sensed level and sensed pressure.

17. The method of claim 11 and further comprising the step of taking corrective action when a leak is determined, the corrective action comprising at least one of: isolating the leak, indicating the leak, continued operation of the system until repairing the leak, replenishing the leak and stopping operation of the system.

\* \* \* \* \*